United States Patent Office 3,543,401
Patented Dec. 1, 1970

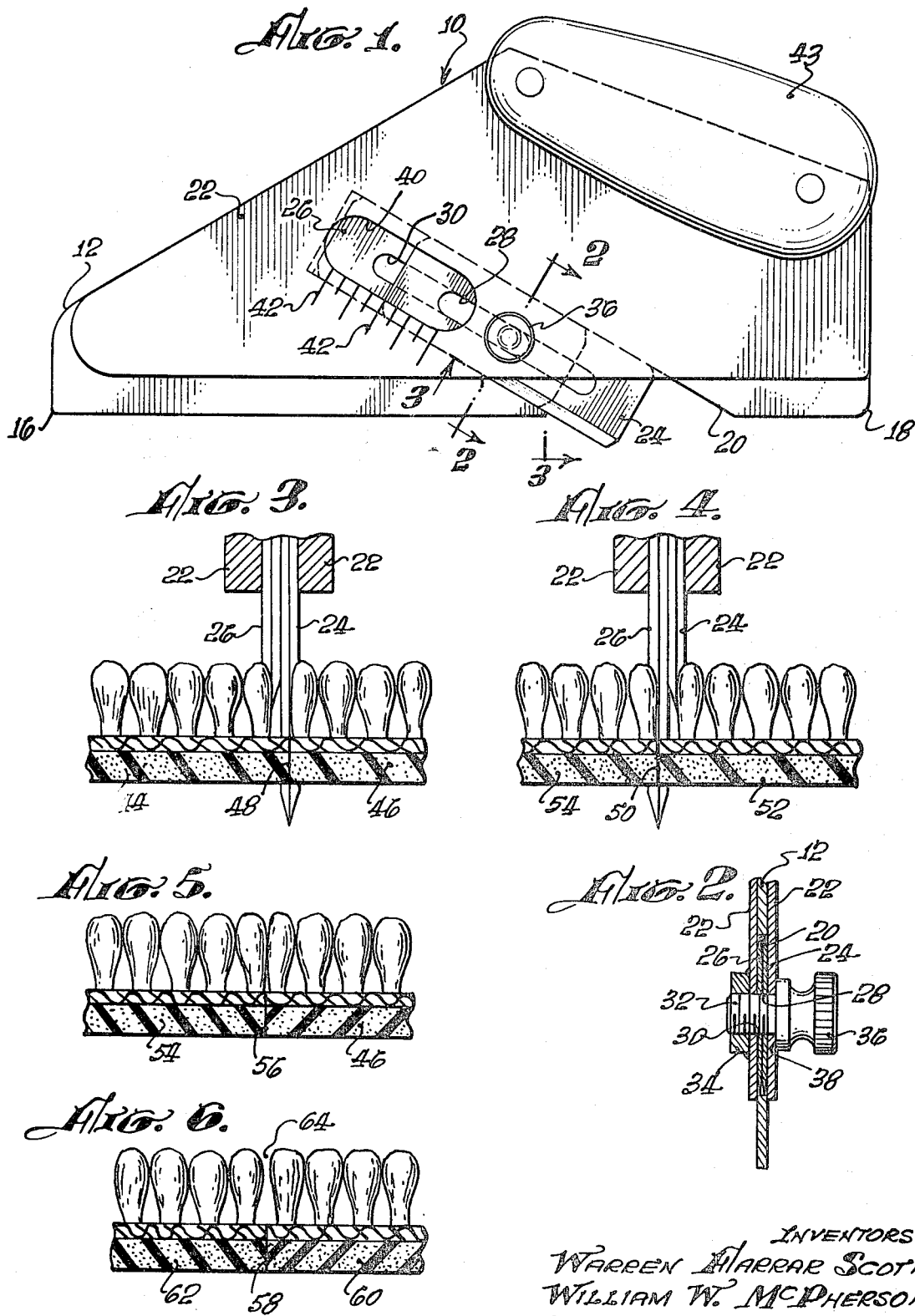

3,543,401
CUSHION BACK CARPET CUTTER
Warren Farrar Scott, West Covina, and William W. McPherson, North Hollywood, Calif., assignors to Roberts Consolidated Industries, Inc., City of Industry, Calif., a corporation of California
Filed Oct. 17, 1968, Ser. No. 768,248
Int. Cl. B26b 29/02
U.S. Cl. 30—294                         4 Claims

ABSTRACT OF THE DISCLOSURE

A cutter for face cutting cushion back carpet, including a guide plate carrying left-hand and right-hand blades in side-by-side relation for cutting close to the carpet pile on the left side and the right side of the guide plate, respectively. The blades are oriented at an acute angle to the carpet engaging edge of the guide plate to operate with a slicing action, and are disposed in a similarly angled notch in the guide plate.

BACKGROUND OF THE INVENTION

The present invention relates in general to a cutter for face cutting cushion back carpet and, more particularly, to a cutter of this type having left-hand and right-hand blades selectively capable of cutting close to tufted piles on the left and the right sides of spaces between adjacent rows of tufts. The blades are inclined at an acute angle to the carpet engaging edge of a guide plate carrying the blades so that the latter cut the foam or sponge backing of this type of carpet cleanly with a slicing action.

In using a carpet cutter of the foregoing conventional type to prepare two pieces of carpet for seaming, the left-hand blade is lowered in cutting or trimming the carpet on the left side of the seam, and the right-hand blade is lowered when cutting or trimming the carpet on the right side of the seam. This procedure results in cutting both pieces of carpet close to the piles on the respective sides of the seam. Consequently, when the two cut edges are brought into abutting relation and seamed together in any desired manner, the piles on the two edges are brought into close proximity to produce an invisible seam.

In prior carpet cutters of the type under consideration, the alternatively useable left-hand and right-hand blades are carried on opposite sides of the guide plate and are selectively movable with respect thereto between retracted and extended positions relative to the carpet engaging edge of the guide plate. Locating the blades on opposite sides of the guide plate in this fashion makes the over-all thickness of prior carpet cutters of the type in question excessive for carpets having closely-spaced rows of pile tufts. Consequently, the blades, in some instances, cut too close to the piles of the carpets being prepared for seaming, and may even slice through the rows of pile tufts, which is undesirable since it may result in the eventual release of some of the tufts along the seam and thus expose the seam.

SUMMARY AND OBJECTS OF INVENTION

In the light of the preceding background, a primary object of the invention is to provide a carpet cutter of the foregoing conventional type wherein the left-hand and right-hand blades are so located relative to the guide plate that the blades will cut close to the piles on the left and right sides, with no possibility of cutting too close to the pile on either side, or through the pile on either side.

More particularly, an important object of the invention is to locate the left-hand and right-hand blades in side-by-side relation in a blade notch formed in the guide plate and intersecting the carpet engaging edge thereof at an acute angle, the combined thicknesses of the blades being slightly less than the thickness of the guide plate and the cutting edges of the blades being spaced apart, in the direction of the thickness of the guide plate, a distance less than the guide plate thickness.

The foregoing construction of the present invention results in a laterally-thin carpet cutter the carpet engaging edge of which is capable of negotiating spaces between rows of pile tufts which are extremely closely spaced, and which will trim close to the pile on either side in an accurate and controlled manner, with no danger of cutting too close to the pile, or into the pile.

Another object of the invention is to provide a carpet cutter having indicia directly indicating the distance the particular blade in use projects beyond the carpet engaging edge so that the depth of cut may be set readily to accommodate a carpet of a particular thickness.

The foregoing objects, advantages, features and results of the present invention, together with various other objects, advantages, features and results thereof which will be evident to those skilled in the carpet cutting and seaming art in the light of this disclosure, may be achieved with the exemplary embodiment of the invention illustrated in the accompanying drawing and described in detail hereinafter.

DESCRIPTION OF DRAWING

In the drawing:
FIG. 1 is a side elevational view of a carpet cutter which embodies the invention;
FIG. 2 is a fragmentary sectional view, on an enlarged scale, taken as indicated by the arrowed line 2—2 of FIG. 1;
FIGS. 3 and 4 are semidiagrammatic, fragmentary sectional views respectively illustrating the operation of the invention in cutting close to the piles on the left-hand and right-hand sides, these figures being taken approximately as indicated by the arrowed line 3—3 of FIG. 1;
FIG. 5 is a semidiagrammatic, fragmentary sectional view illustrating a seam between carpets cut or trimmed with the invention; and
FIG. 6 is a view similar to FIG. 5, but showing the gap which can result above a seam between carpets trimmed with prior cutters.

DETAILED DESCRIPTION OF EXEMPLARY EMBODIMENT OF INVENTION

In the drawing, the cutter of the invention is designated generally by the numeral 10 and includes a guide plate 12 of substantially uniform thickness having a longitudinally extending, straight, carpet engaging edge 14 thereon with a leading end 16 and a trailing end 18. The guide plate 12 is provided therein with a generally rectangular, inclined blade notch 20 therein disposed at an acute angle, e.g., about 30°, to and intersecting the carpet engaging edge 14, the blade notch sloping toward the trailing end 18 of the carpet engaging edge.

Two retaining plates 22 are respectively disposed on opposite sides of and rigidly secured to the guide plate 12, as by spot welding, not shown. These retaining plates are spaced from the carpet engaging edge 14 of the guide plate 12 so as to leave the carpet engaging edge exposed. The retaining plates 22 span all of the blade notch 20 except the lower end thereof, as will be clear from FIG. 1 of the drawing.

Generally rectangular left-hand and right-hand blades 24 and 26 are disposed in the blade notch 20 between the portions of the retaining plates 22 which span the blade notch. To permit accommodation of the blades 24 and 26 in side-by-side relation between the two retaining plates 22, the sum of the thicknesses of the blades is slightly less than the thickness of the guide plate 12. In other words, the thickness of each blade 24 and 26 is slightly less than one-half the guide plate thickness.

The edges of the blade notch 20 and the spanning portions of the retaining plates 22 serve as a guide means permitting longitudinal sliding movement of the left and right blades 24 and 26 relative to the carpet engaging edge 14 and relative to each other. Thus, either blade 24 or 26 may be extended beyond the carpet engaging edge 14 any desired amount, within the range of the device. Alternatively, both blades 24 and 26 may be retracted so that their lower ends are above carpet engaging edge 14, as in transporting or storing the device.

The blades 24 and 26 are provided with elongated longitudinal slots 28 and 30 for a screw 32 which extends through the two retaining plates 22 and is threaded through a nut 34 welded, or otherwise secured, to one of them. The screw 32 is provided with a knurled head 36 having an annular shoulder 38 seated against the retaining plate 22 opposite the one carrying the nut 34. As will be apparent, by loosening the screw 32, the two blades 24 and 26 may be adjusted relative to the carpet engaging edge 14 and relative to each other to place either blade in an extended, operating position with a desired depth of cut corresponding to a particular carpet thickness. Thus, the screw 32 and nut 34 cooperate with the retaining plates 22 and the slotted blades to serve as an adjustable retaining means for the blades.

At least one of the retaining plates 22 is provided therein with an aperture or window 40 which is elongated in the direction of the blade notch 20 and through which the inner or upper ends of the blades 24 and 26 may be seen. This retaining plate 22 is provided thereon adjacent one edge of the window 40 with indicia 42 indicating the depths of cut of the blades 24 and 26. More particularly, if the upper end of one of the blades 24 and 26 is placed opposite a particular indicium, the lower end of such blade will project below the carpet engaging edge 14 a distance to achieve a corresponding depth of cut for a particular carpet thickness. If desired, each retaining plate 22 may be provided with a window 40 with indicia 42 so that the depths of cut of the blades 24 and 26 may be viewed from either side.

Preferably, the blades 24 and 26 are double edged so that, when the lower cutting edges become dull, the blades may be reversed to bring the edges which were previously uppermost into use. As shown in FIG. 2, and as best shown in FIGS. 3 and 4, each cutting edge is formed by beveling the corresponding blade edge on both sides, whereby the cutting edges are laterally spaced apart, but a distance less than the thickness of the guide plate 12.

The cutter 10 is provided with a suitable handle 43, appropriately connected to the retaining plates 22 and/or the guide plate 12.

Turning now to a consideration of the operation of the invention, FIG. 3 of the drawing shows the left blade 24 extended to trim excess 44 from a carpet 46. It will be noted that the cut 48 made by the blade 24 is close to the pile on the left side of the space between two adjacent rows of tufts. Similarly, FIG. 4 shows the right blade 26 extended to make a cut 50 close to the pile on the right side in trimming excess 52 from a carpet 54.

It will be noted that, while the blades 24 and 26 make the respective cuts 48 and 50 close to the piles on the left and right side, respectively, the blades cannot cut too close to the piles, or through the piles, because of the fact that the cutting edges of the blades are confined between the opposite sides of the guide plate 12. Thus, the trimmed edges of the carpets 46 and 54 are close to the corresponding piles, but still spaced therefrom slightly.

With the foregoing, when the cut edges of the carpets 46 and 54 are subsequently brought into abutting relation and seamed in any suitable manner, as shown at 56 in FIG. 5, the piles are also brought into abutting relation to completely conceal the seam. Also, the piles adjacent the respective cut edges are still firmly anchored in the backings of the two carpets 46 and 54 so that they will not come out in use to expose the seam.

FIG. 6 shows the type of exposed seam 58 between carpets 60 and 62 which result from the use of prior cutters incapable of cutting sufficiently close to the piles. In this case, a space 64 between the adjacent piles remains and reveals the existence of the seam 58. Such a gap cannot occur when seaming carpets trimmed by the cutter 10 of the present invention.

Although an exemplary embodiment of the invention has been disclosed herein for purposes of illustration, it will be understood that various minor changes, modifications and substitutions may be incorporated in such embodiment without departing from the spirit of the invention.

We claim as our invention:

1. In a cutter for face cutting cushion back carpet, the combination of:
    (a) a guide plate of substantially uniform thickness having a longitudinally extending, straight carpet engaging edge thereon with a leading end and a trailing end, and having a generally rectangular blade notch therein disposed at an angle to and intersecting said carpet engaging edge and sloping toward said trailing end thereof;
    (b) two retaining plates respectively disposed on opposite sides of and rigidly secured to said guide plate and spaced from said carpet engaging edge to expose same, said retaining plates spanning blade notch;
    (c) two generally rectangular blades disposed in said blade notch in side-by-side relation and movable longitudinally thereof, the combined thickness of said blades being slightly less than the thickness of said guide plate, each of said blades having a longitudinal cutting edge thereon, said cuting edges being disposed along the lower edge of said blade notch and being spaced apart in the direction of the thickness of said guide plate, the length of said blades being substantially less than the length of said blade notch to permit retraction of said blades completely into said blade notch from extended positions where the outer ends of said blades project beyond said carpet engaging edge;
    (d) adjustable retaining means for retaining said blades in said blade notch in any desired position relative to each other and relative to said carpet engaging edge; and
    (e) handle means on at least one of said plates.

2. A cutter as set forth in claim 1 wherein at least one of the retaining plates is provided with an aperture therein opposite the inner end of said blade notch to permit visual determination of the positions of the inner ends of said blades in said blade notch.

3. A cutter according to claim 2 wherein said one retaining plate is provided with indicia thereon along said aperture to indicate the distance each of said blades extends beyond said carpet engaging edge.

4. In a cutter for face cutting cushion back carpet, the combination of:
    (a) a guide plate having a longitudinally extending, straight carpet engaging edge thereon and provided with a generally rectangular blade notch disposed at an angle to and intersecting said carpet engaging edge;
    (b) two generally rectangular blades movable longitudinally of said blade notch and having lower cutting edges spaced apart in the direction of the thickness of said guide plate a distance not exceeding such thickness, the combined thicknesses of said blades being slightly less than the thickness of said guide plate;
(c) means for retaining said blades in said blade notch in any desired position relative to each other and relative to said carpet engaging edge; and
(d) handle means connected to said guide plate.

References Cited

UNITED STATES PATENTS 2,567,102 9/1951 Cook _____ 30—294
3,337,955 8/1967 Poletajev _____ 30—294

GRANVILLE Y. CUSTER, Jr., Primary Examiner